US011758855B2

(12) United States Patent
Shoup

(10) Patent No.: US 11,758,855 B2
(45) Date of Patent: Sep. 19, 2023

(54) TURF AND LAWN COIR

(71) Applicant: GENUS INDUSTRIES, LLC, Oregon City, OR (US)

(72) Inventor: David E. Shoup, Oregon City, OR (US)

( * ) Notice: Subject to any disclaimer, the term of this patent is extended or adjusted under 35 U.S.C. 154(b) by 0 days.

(21) Appl. No.: 16/973,491

(22) PCT Filed: Nov. 11, 2019

(86) PCT No.: PCT/US2019/060756
§ 371 (c)(1),
(2) Date: Dec. 9, 2020

(87) PCT Pub. No.: WO2020/106484
PCT Pub. Date: May 28, 2020

(65) Prior Publication Data
US 2021/0243969 A1 Aug. 12, 2021

Related U.S. Application Data

(60) Provisional application No. 62/769,316, filed on Nov. 19, 2018.

(51) Int. Cl.
*A01G 24/25* (2018.01)
*A01G 20/20* (2018.01)
*A01G 20/10* (2018.01)

(52) U.S. Cl.
CPC ............ *A01G 20/20* (2018.02); *A01G 20/10* (2018.02); *A01G 24/25* (2018.02)

(58) Field of Classification Search
CPC ........ A01G 24/25; A01G 24/20; A01G 24/22; A01G 24/28; A01G 24/42; A01G 20/00;
(Continued)

(56) References Cited

U.S. PATENT DOCUMENTS 1,751,430 A * 3/1930 Thomson ................ B28B 5/02
106/680
2,717,419 A * 9/1955 Dickey ..................... C10L 5/14
264/297.6
(Continued)

FOREIGN PATENT DOCUMENTS

CN 2194262 4/1995
CN 104114051 10/2014
(Continued)

OTHER PUBLICATIONS

Machine translation of JP-H07328798-A to Tsushimo. (Year: 1995).*
International Search Report and Written Opinion, PCT/US2019/060756, dated Jan. 14, 2020.

*Primary Examiner* — Kathleen I Alker
(74) *Attorney, Agent, or Firm* — Miller Nash LLP

(57) ABSTRACT

A coir pellet has coconut pith mixed with at least one other material, and binder mixed into the coconut pith, wherein the coconut pith, at least one other material and the binder are compressed at a ratio of at least 3:1. A method of producing coir pellets includes conditioning coconut pith and at least one other material to produce conditioned material, first compressing the conditioned material to produce pellets of a first size at a first compression ratio, at least a second compressing the pellets of a first sized to produce pellets of at least a second size at a second compression ratio, wherein the second size is smaller than the first size, and the second compression ratio is higher than the first compression ratio, polishing the pellets of at least a second size to produce polished pellets, and drying the polished pellets to produce the coir pellets.

10 Claims, 10 Drawing Sheets

US 11,758,855 B2
Page 2

(58) Field of Classification Search
CPC ........ A01G 20/10; A01G 20/20; A01C 7/008; A01C 1/04; A01C 1/046; A01C 1/06; A01K 1/0152; B30B 11/16
USPC ........ 47/9, 56, 57.6, 58.1 R, 58.1 SC; 71/23, 71/24; 106/406; 119/171–173
See application file for complete search history.

(56) References Cited

U.S. PATENT DOCUMENTS

| | | | |
|---|---|---|---|
| 2,729,855 A * | 1/1956 | Titus | C01F 7/025 264/297.6 |
| 2,858,576 A * | 11/1958 | Rose | D01H 5/64 15/209.1 |
| 3,255,285 A * | 6/1966 | Chilson | B30B 11/16 264/109 |
| 3,775,034 A | 11/1973 | Knapp | |
| 3,842,537 A | 10/1974 | Bishop | |
| 3,849,041 A | 11/1974 | Knapp | |
| 4,130,072 A * | 12/1978 | Dedolph | A01G 24/60 111/104 |
| 4,349,493 A | 9/1982 | Casberg et al. | |
| 5,073,323 A * | 12/1991 | McCartney | B28B 7/364 425/395 |
| 5,385,096 A * | 1/1995 | Suzuki | B41F 35/02 15/256.52 |
| 6,219,968 B1 * | 4/2001 | Belger | C09K 17/52 47/64 |
| 6,408,568 B1 | 6/2002 | Kusey et al. | |
| 6,516,565 B1 | 2/2003 | Fima | |
| 7,892,302 B2 * | 2/2011 | Clark | C10L 5/44 44/596 |
| 8,316,581 B2 * | 11/2012 | Rubin | B01J 20/14 47/58.1 SC |
| 2004/0025422 A1 | 2/2004 | MacQuoid et al. | |
| 2006/0048446 A1 | 3/2006 | Kim | |
| 2009/0113791 A1 | 5/2009 | Bertin et al. | |
| 2015/0145164 A1 * | 5/2015 | Lipscomb | B29C 48/0022 264/232 |
| 2017/0245438 A1 * | 8/2017 | Limbaugh | A01G 24/44 |

FOREIGN PATENT DOCUMENTS

| | | | | |
|---|---|---|---|---|
| DE | 102007059745 | | 6/2009 | |
| GB | 191106200 A | * | 3/1912 | ............. B30B 11/16 |
| GB | 606202 A | * | 8/1948 | ............. B28B 3/14 |
| JP | H07328798 A | * | 12/1995 | ............. B30B 11/16 |
| KR | 20110125939 | | 11/2011 | |
| WO | 2004078892 A1 | | 9/2004 | |

\* cited by examiner

TURF AND LAWN COIR

CROSS-REFERENCE TO RELATED APPLICATIONS

This application is a 371 of International Application No. PCT/US2019/060756, filed Nov. 11, 2019, which claims priority to and the benefit of U.S. Provisional Application No. 62/769,316 filed Nov. 19, 2018, both of which are incorporated herein by reference in their entirety.

BACKGROUND

The use of soil amendments and additives provide users with an increase in the fullness and richness of the soil, and higher productivity of plants and trees. However, many of the soil amendments involve chemicals that can be hazardous to humans and animals during application, until they are absorbed. In addition, the costs of these materials is relatively high and they generate high levels of waste materials during manufacture. It would be desirable to have an organic, safer, less expensive soil amendments and additives.

DETAILED DESCRIPTION OF THE EMBODIMENTS

Figure 1:
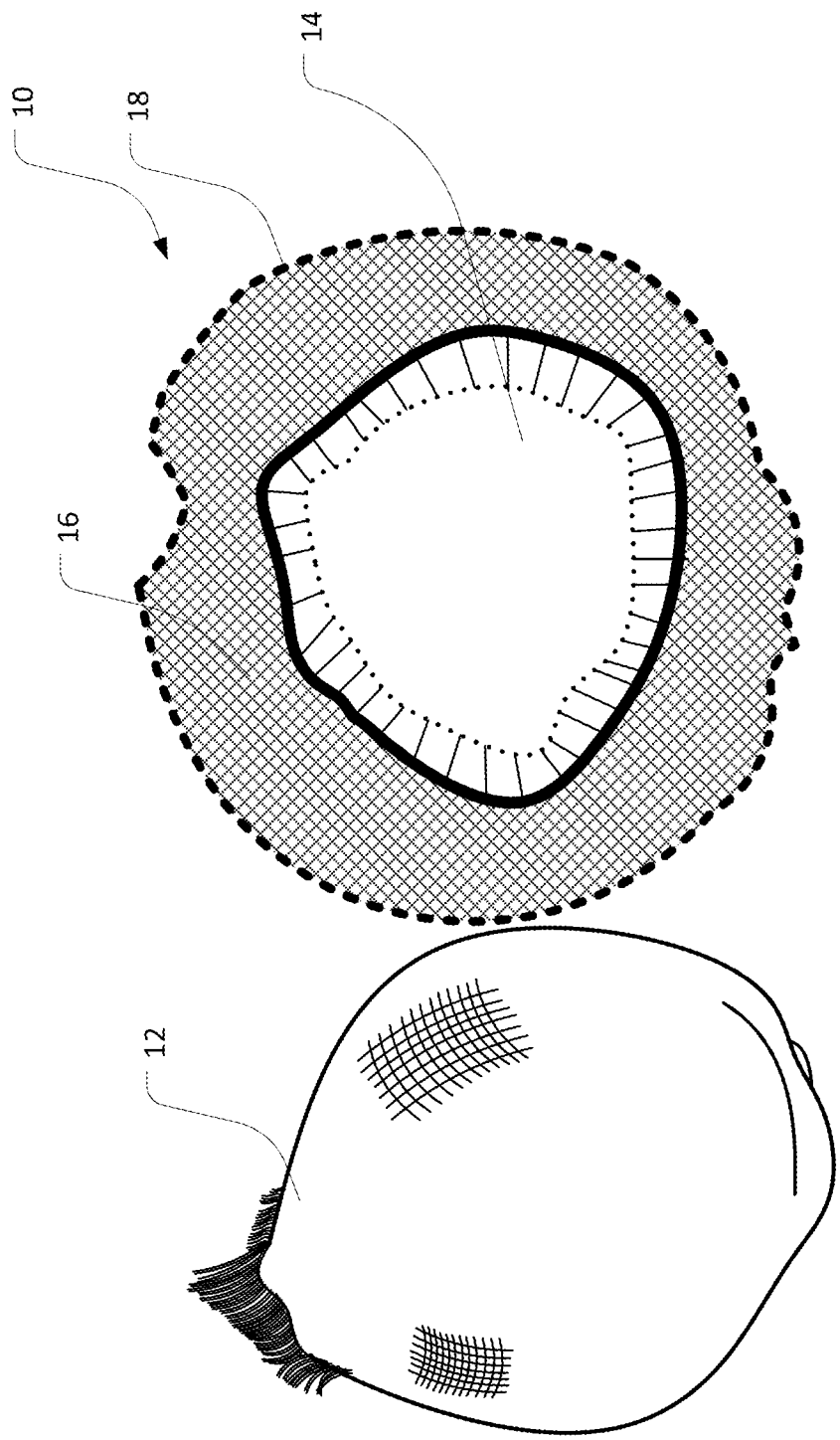
FIG. 1 shows an interior view of a coconut.

FIG. 1 shows a coconut 10 split open, with its husk 12 next to it. Most people refer to the white innermost material 14 as its 'meat,' 'copra,' which also contains coconut water. Pith 16 makes up the layer of spongy material 16 between the meat 14 and the hard outer shell 18. Pith is highly absorbent and has uses in many applications, including as a soil amendment or supplement, cat litter, etc.

Figure 2:
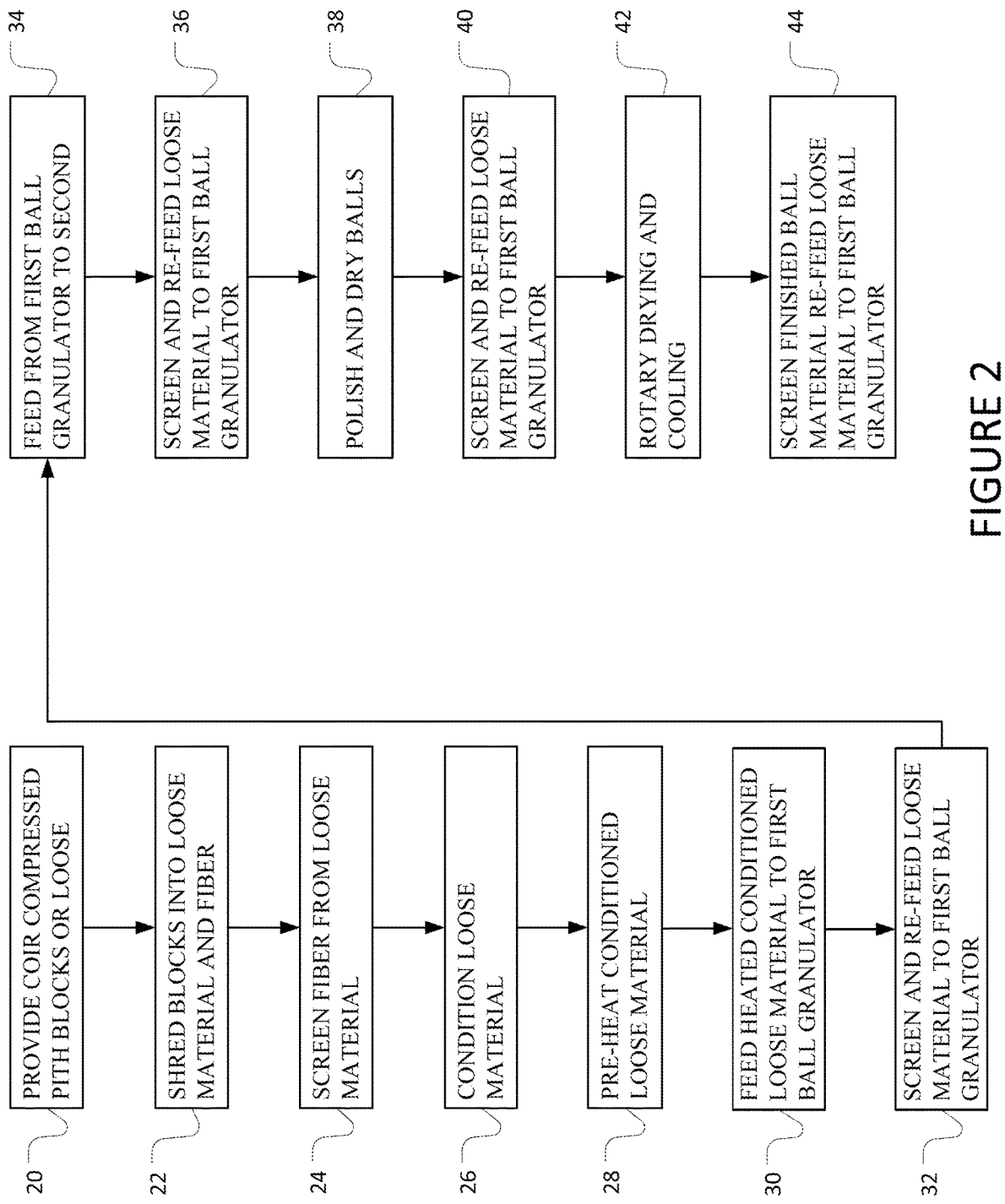
FIGS. 2-3 show embodiments of manufacturing coir pellets.

Coconut pith may exist in the form of highly compressed blocks of material. If the pith takes some other form, some of the parts of the processes may become optional. FIG. 2 shows an embodiment of a method of producing turf and lawn coir pellets. In the embodiment of FIG. 2, the coir comprises compressed blocks at 20. However, it could also consist of loose material and fibers. The process shreds the blocks into loose material at 22, if needed. The reference to 'loose material' means pith material. The loose material may have fibers mixed with it. This may undergo washing and drying to below 15% moisture before receiving any amendments.

As will occur throughout the process, between different forming processes, the resulting loose or formed material will undergo screening to remove any unused loose material and return it to the beginning of the process flow, such as at 24. This conserves the loose pith material and reduces waste. While some embodiments may include this recovery and return process after each step, one should note that it might occur less often than that. No loose material may exist after some processes, so the process may not need to further screen and return the material.

A binder and other amendments may be added to the loose material to both assist in formation of the round ball pellets, as well as provide extra benefits as lawn and turf nutrients, including grass seed. The washing, drying and adding of amendments may occur prior to or after screening, and may comprise one single process or two different processes as shown in FIG. 2 as conditioning the loose material at 26.

In one embodiment, the pith undergoes blending and conditioning with molasses at a concentration of 0.5-1.0%, a starch, such as a tapioca starch at a concentration in the range of 0.3-0.9%, and may also receive granulated coconut hard shell crumbs at a concentration of 2.0%-5.0%, with the crumbs having sizes ranging from approximately 2 mm to 10 mm. This brings the cumulative moisture content to between 10-12%. The amended material then dries for up to 1-2 hours, and then undergoes more blending to produce a more conditioned pith material.

The process heats the conditioned loose material at 28 prior to introducing the material into the first ball granulator at 52, which the discussion may also refer to as a non-stick ball cup roller. As will be discussed in more detail further, these machines compress the loose materials into dies that form half-spheres. The machine then presses the half spears together to form balls or pellets. The resulting material will have formed material in the shape of pellets and may possibly include loose material that can be cycled back into the beginning of the process.

Adding additional, dryer loose unconditioned pith material can control the moisture content of the conditioned pith material entering the granulating ball processer at 30. This occurs in parallel with the conditioned material entering at a flow rate necessary to address any material sticking within the ceramic-coated ball forming cups, or to address conditioned material not forming into balls on contact with the first ball granulator. The term 'ball granulator" as used here refers to a dual individual apposed ball forming cupped cylinder drums. These machines have cylinders having half-spherical impressions into which the loose material is pressed. The two halves are then pressed together to form a ball, or pellet, of the material. Instead of ceramic, the ball forming cups could have a non-stick coating such as polytetrafluoroethylene (PTFE), the most common brand of which is Teflon®. Other non-stick coatings could comprise anodized aluminum, silicone, enameled cast iron, and other seasoned metal surfaces.

In some instances, not all of the loose material forms into the balls, and in further processes not all of the balls undergo further compression by the next ball granulators. Periodically, the process will run the resulting combination of formed material, being balls, and loose material, either less compressed balls or loose material through a screening process such as shown at 32. One should note that while the figures show several ball-screening processes, the process might only screen once. Each successive ball granulator compresses the balls into a smaller size, so the process can scree out the larger size balls.

After going through a first ball granulator and then through the screen, the balls from the first ball granulator go through a second ball granulator at 34. This particular embodiment screens the resulting material and returns any loose material or larger balls to the first ball granulator at 36. The process then polishes and dries the balls at 38, with another option screening at 40. The balls then may undergo drying and cooling at 42. If desired, the process can perform a final screening at 44. The process results in compressed pellets of coconut pith with some amendments, such as the starches, molasses and hard shell granulars mentioned above, as well as other amendments, such as material used for fertilization, deodorizing materials in the case of cat litter, etc.

Figure 3:
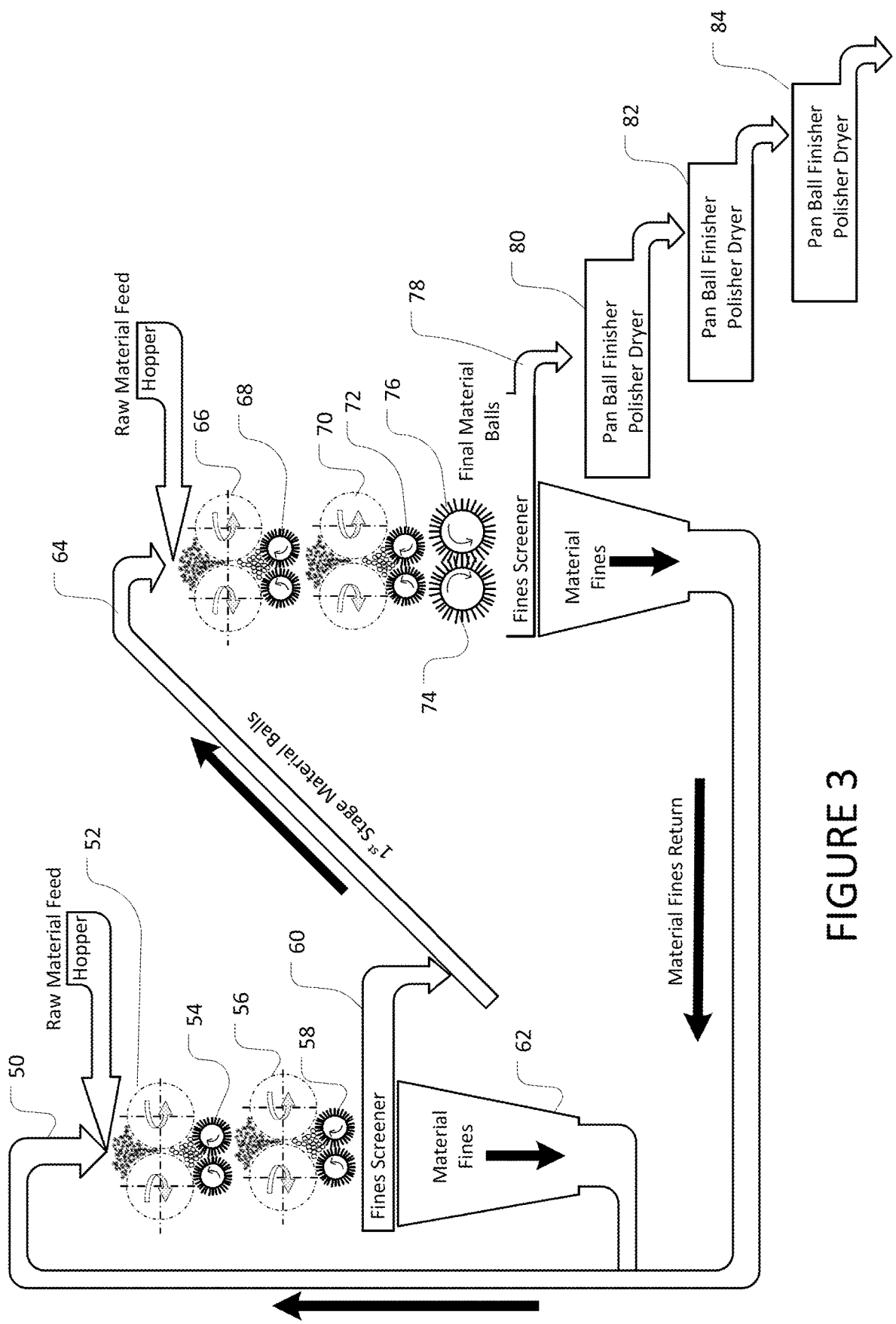

FIG. 3 shows another embodiment of producing turf lawn and coir pellets. The pith material may receive the conditioning mentioned above at the beginning of the discussion of FIG. 2. The loose conditioned material flows into a hopper such as 50 shown in FIG. 3, begins to form into half balls that are then compressed from two halves into united individual balls, at about a 3-1 compression ratio at 52 in FIG. 3. One should note that each subsequent ball granulator makes smaller pellets than the previous ball granulator does, so the pellets or balls resulting from each one have undergone tighter and tighter compression. The particular compression ratios called out here serve merely as examples and no intention exists to limit the compression ratios to any particular ratio. The ratio is the ratio of the compressed material versus the loose material. For example, a compression ratio of 10:1 means that the compressed material takes up $1/10^{th}$ the space as the same amount of the loose material.

The coconut hard shell crumbs have a pulling effect on the cupped balled material to break away from the cups by pulling on the cupped material from the ceramic-coated drum cups. The material is compressed into half cups and then pressed together to form the balls, also called pellets. An issue that can arise is loosening the balls from the ball cups, as the compression used to form them can make them stick in the cups.

In one embodiment, two horizontal spiked rotary separators strike each individual cupped cylinder drum to dislodge and remove any leftover material fines or undersize material balls from the drum ball cups at 54 in FIG. 3. The resulting formed material passes into a second pair of dual ball forming cupped cylinder drums at 34 at 56. The process cleans the formed material out of the cups of the first ball granulator to enable the cups to receive more conditioned loose material.

Prior to feeding the formed material to the second ball granulator at 56, the process may add additional amendments, if desired, to amend or assist with the material processing, proficiency or desired product consistency. The only characteristic of the ball compactors is that the cups get progressively smaller and the balls become more compacted.

Figure 6:
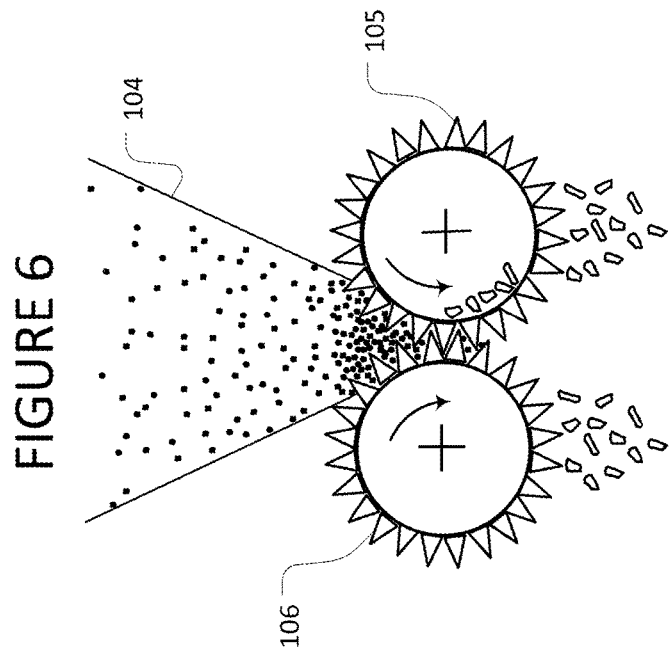
FIG. 6 shows diagrams of spiked rotary separators.
Figure 5:
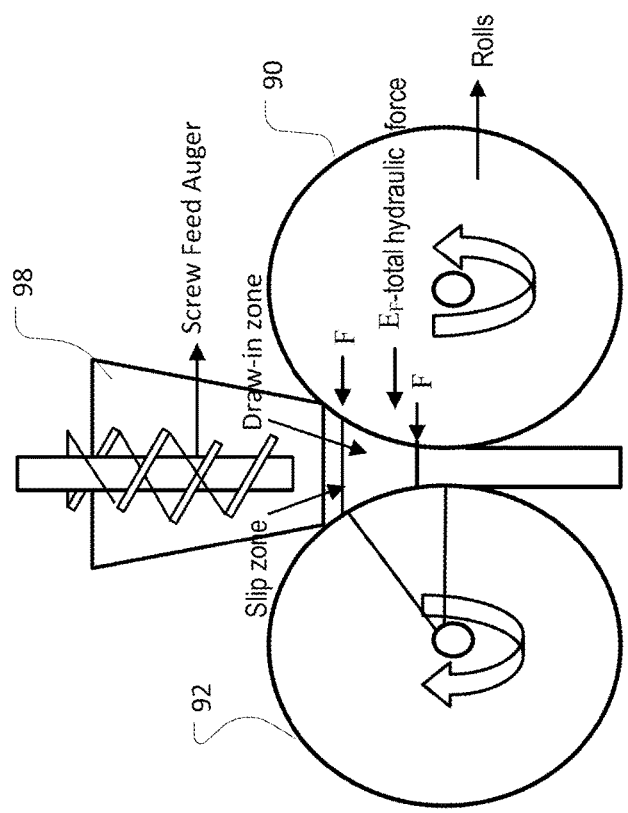

The first set of mated cupped drums at 52 have combined the mated halves to make combined single balls in FIG. 6, the formed material, or balls, then leave the first set of dual cupped cylinder drums and move of dual ball cupped drums at 56 to form slightly smaller balls from the larger prior highly compressed material ball halves. The cupped ball granulators again mate the ball halves to make a complete material ball. In one embodiment, the first set at 52 may compress the balls at a ratio of 3:1 and the second may have a compression ratio of about 5:1.

At 58, two horizontal spiked rotary separators strike each individual apposed cupped cylinder drum to dislodge and remove any leftover material fines or undersize material balls from the ceramic-coated drum ball cups. The resulting material passes onto a material screener 60 below the dual ball forming cupped cylinder drums of 56. The process cleans the second cup granulator to enable the cups to receive more conditioned material.

In addition to the striking of the cups to loosen stuck balls, the may pass through two opposed spiked rollers to remove and separate any excess loose material or soft balls before dropping onto the material fines screener 60, which then may returned to the hopper 50.

The process repeats itself with the formed balls by conveying them using conveyor 64 to the hopper, where they undergo further compression at 66, possible to a ratio of 8:1. The strikers then strike the balls out of the cup drums at 68, and the balls enter a forth cup cylinder drum/ball granulator at 70

In addition to the ball cup cleaners, rotary separators separate material fines and undersize material balls away the fully formed balls. While only shown at 74 and 76 in FIG. 3, they may operate at different parts of the processes as desired. Material fines fall separately from the combined balls to the screener 78 for reprocessing again into mated material balls. The final compressed version of the balls may have a compression ratio of about 10-1. The final compressed ball material then enter the ball polishing process.

In one embodiment, the highly compressed and uniformed material balls from the last set of ceramic coated cupped cylinder drums move to the first of three ball polishing rotating pans used to dry, add additional amendments or material, and properly shape and finish the material balls to desired specification. In this particular embodiment, the process uses three ball polishers at 80, 82 and 84, but no requirement exists for that particular number.

The balls may receive further conditioning, such as additional binder, etc., as they enter a first ball polisher/dryer 80. Then they travel to a second ball polisher/dryer 82, and then a third polisher/dryer at 84. Depending upon the specifications for moisture content, etc., the different ball polishers may use different rotational speeds and have different temperatures of hot air. As will be discussed in more detail later, the balls may also enter a rotary dryer for further drying and cooling after undergoing polishing.

Figure 4:
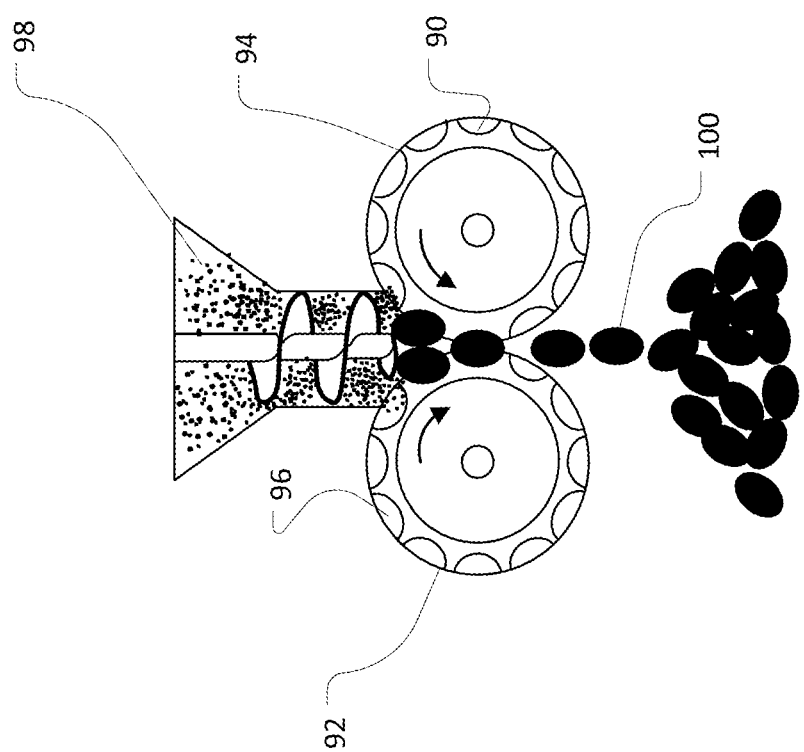
FIGS. 4-5 show an embodiment of ball granulator.

Having covered overall processes for producing turf and lawn coir pellets, the discussion now turns to individual examples and embodiments of various machines and other equipment used in processes such as those disclosed in the embodiments. For example, FIG. 4 shows a diagram of the ball granulators/ball presses. In FIG. 4, the loose material or larger balls enter the machine through the hopper 98. The two apposed rollers 90 and 92 receive the material as it falls into the half cups such as 94 and 96. The rollers turn, they press the material in each of the half cups together to form pellets or balls such as 100.

FIG. 6 shows an embodiment of the spiked rotary separator such as 76 from FIG. 3. The two rollers 105 and 106 roll opposite to each other allowing them to pass the material from the hopper 104 downwards to the next state.

Figure 7:
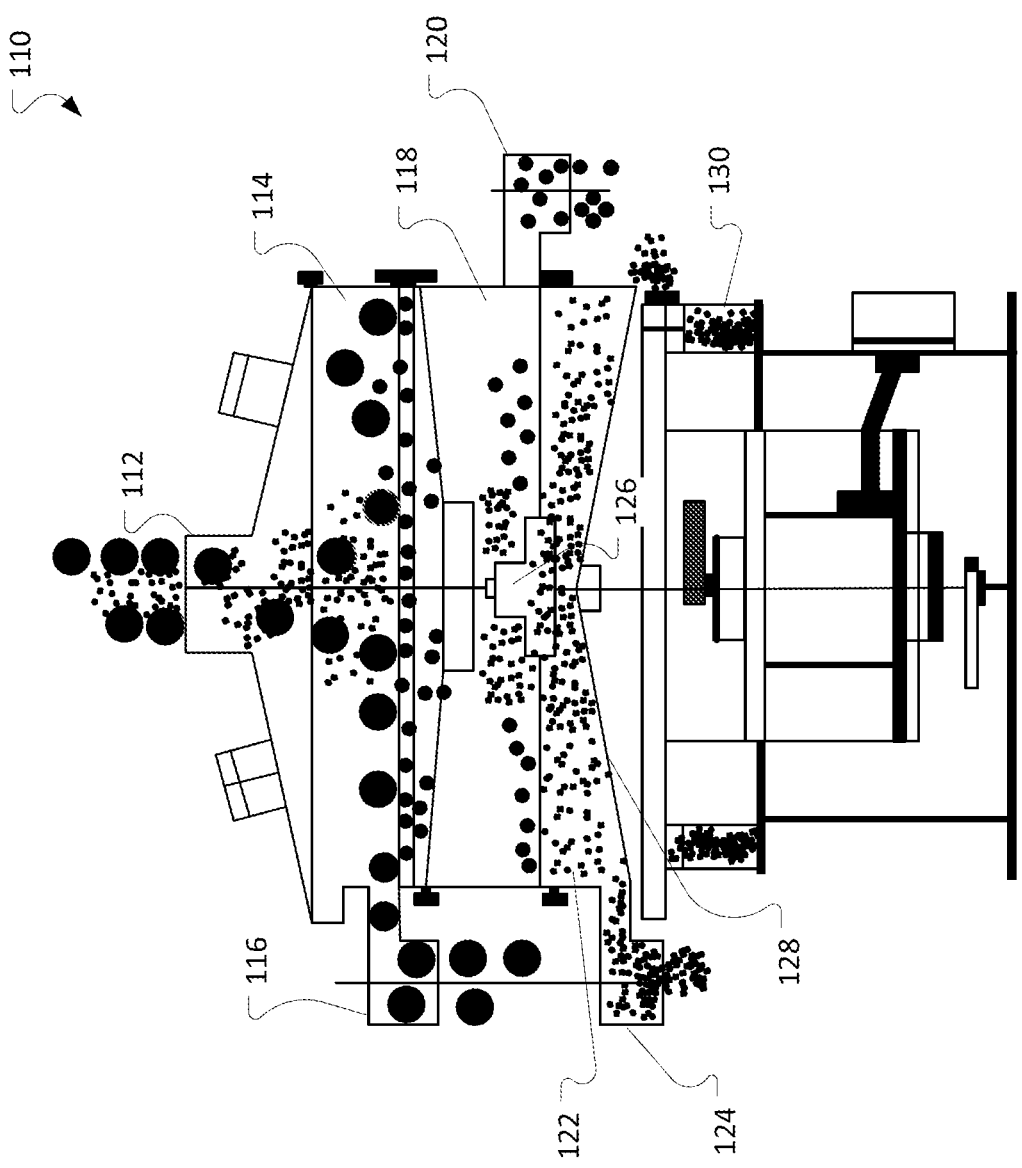
FIG. 7 shows the vibrating screen.

FIG. 7 shows one embodiment of a vibrating screen 110 possibly employed in the various screening and recovery processes from FIGS. 2 and 3. This provides just one example of a possible screen. Other possibilities provide laterally vibrating screens that cause the smaller material to fall from the larger material, leaving the more uncompressed balls on the top, with the fines falling all the way to the bottom. As can be seen in FIG. 7, the mix of balls of different sizes and the loss material enter through inlet 112. In the top compartment 114, the vibration of the screen causes the larger uncompressed balls to exit through the outlet 116. The smaller balls and fines fall to the compartment 118, with the smaller balls exiting through the outlet 120 and the fines 122 falling to the outlet 124. The vibration in this particular embodiment results from a center tensioning ball 126 and the spring assembly 130. The domed piece 128 allows the movement of the fins to the outside along its slope.

Figure 8:
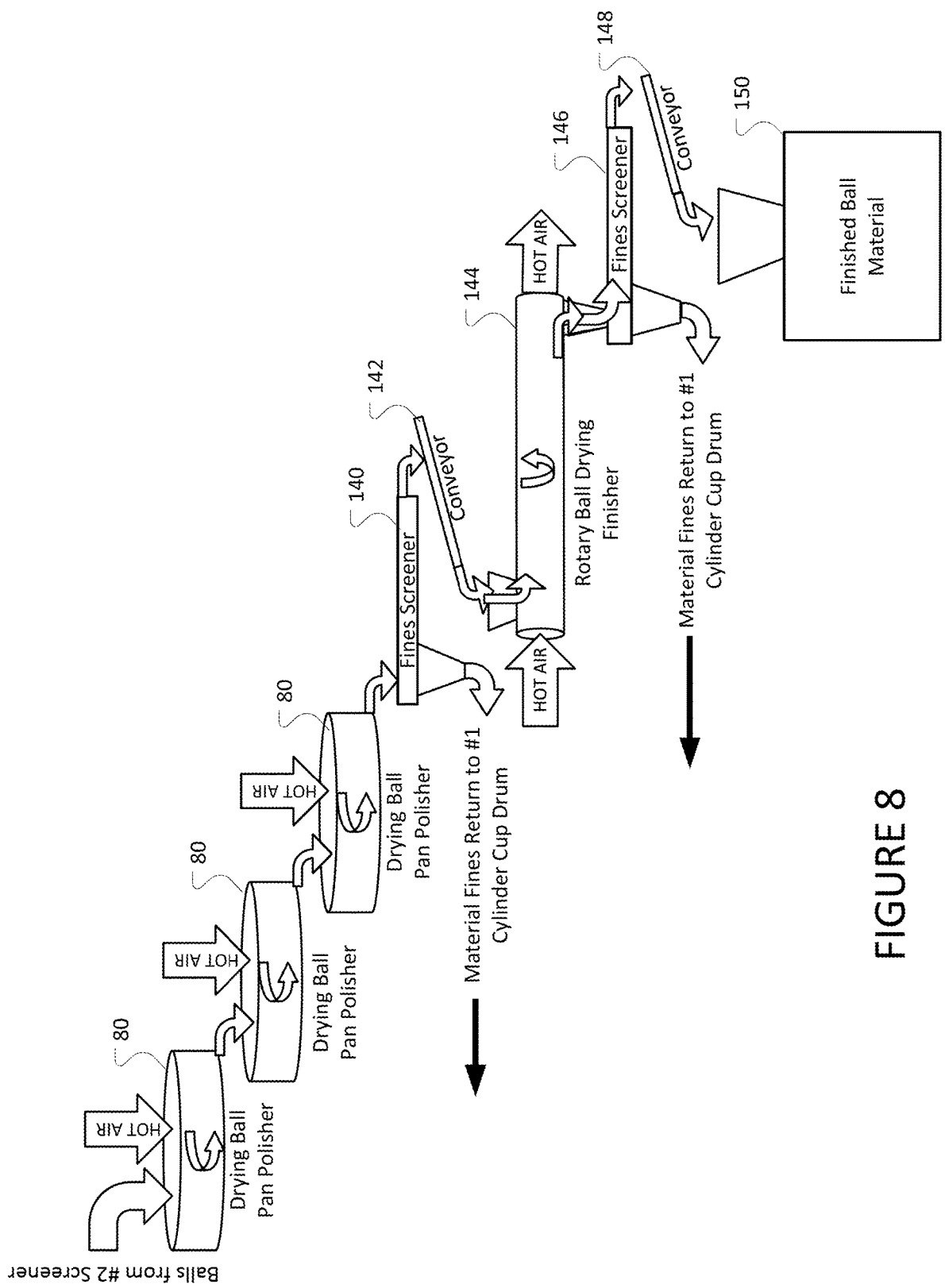
FIG. 8 shows the ball polish process.

FIG. 8 shows a more detailed view of one embodiment of a ball polishing process. As mentioned previously, this embodiment uses three rotary ball polishers, but the number of ball polishers and the particular type used is left up to the system designer. In FIG. 8, the balls exit the compression process more than likely after a screening process. The resulting balls fall into a first ball polisher, in this case a rotary ball polisher that spins the balls inside a cavity to polish the balls. The addition of hot air also assists in the drying process. After some pre-determined time, or if the balls reach a pre-determined humidity/water content level, they move to a second ball polisher, where the process repeats itself until they move to the third ball polisher. The determination of the balls moving from one polisher to the other may depend upon time, temperature, humidity, etc. In addition, further amendments could be made to the balls as they undergo polishing.

After completion of the polishing process, the polished balls may undergo a further screening at 140, and then a conveyor 142 may bring them to a rotary or other final drier 144. Yet another screen process may occur at 146 and the finished balls ride a conveyor 148 to a bin 150. The final drier may stir the balls and cool them from their heated state after polishing.

The resulting balls then undergo screening at 96 and the conveyor 98 passed them to a rotary dryer 100. If desired, the balls can undergo another screening at 120 and then conveyor 104 places them in a final bin 106.

Figure 9:
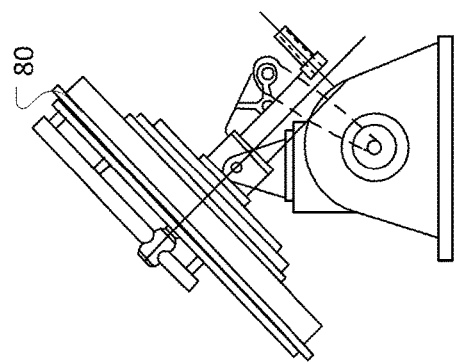
FIGS. 9-10 show examples of different ball finishers/polishers.
Figure 10:
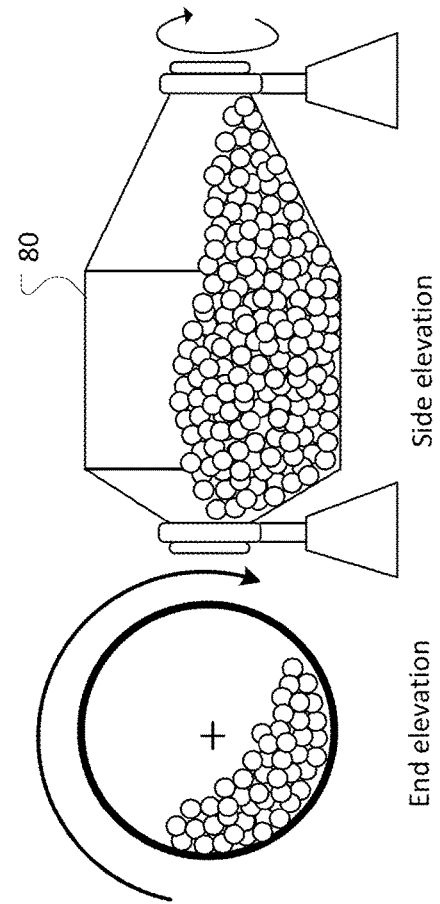
Figure 11:
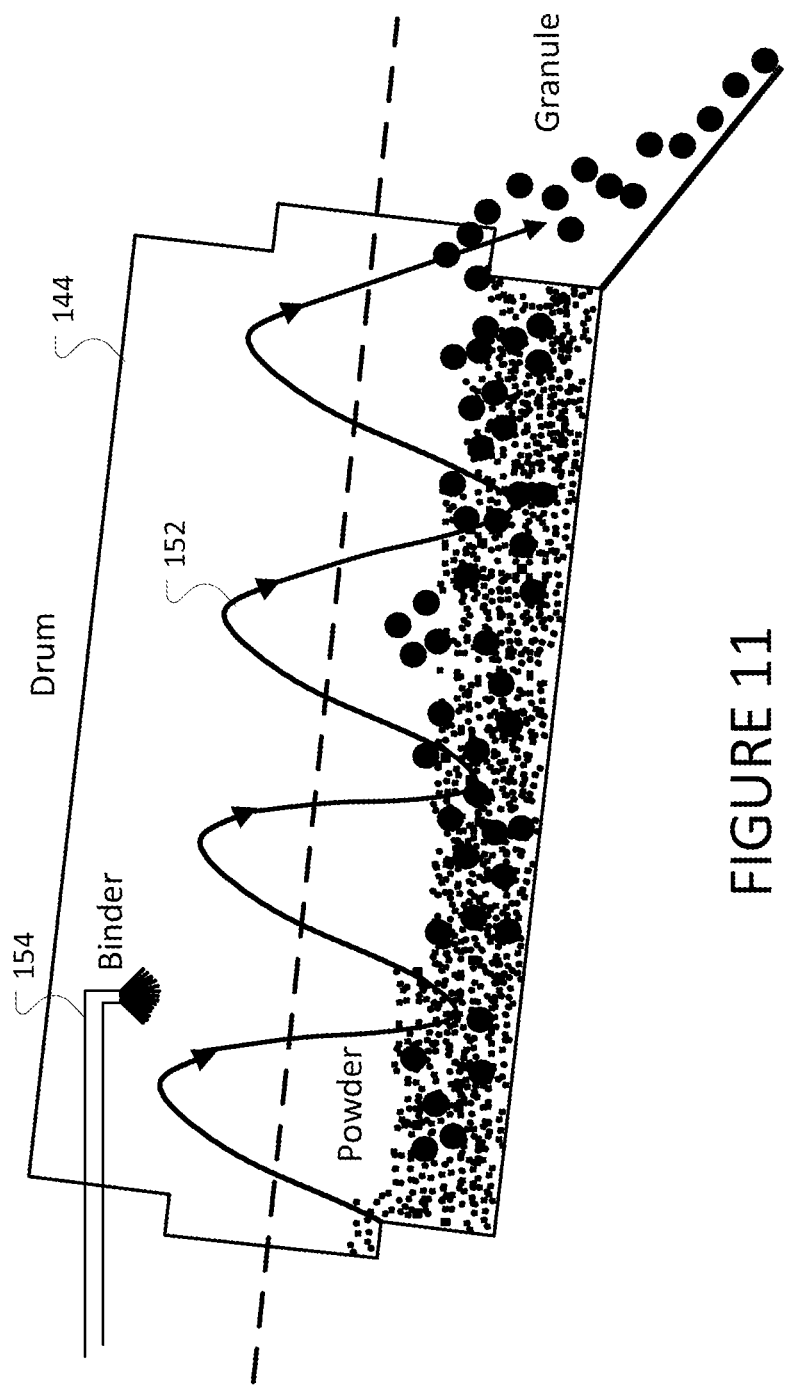
FIG. 11 shows an example of a rotary dryer.

FIGS. 9 and 10 show two different types of ball polishers such as 80 from FIG. 8. In FIG. 9, a rotary ball polisher has a pan that tilted between horizontal and vertical that spins, in turn causing the balls to spin and polish themselves against the sides of the pan and each other. In FIG. 10, a horizontal ball polisher spins the ball in its interior along a horizontal axis.

As shown in FIG. 8, after polishing the balls enter a rotary dryer for drying and, typically, cooling, as set out in FIGS. 2 and 3. The drum 144 may have an auger or skewer 152 that spins internally in the drum to move the pellets to keep them from sticking together, as well as to allow air movement. If desired, a dispenser 154 may dispense a binder or other material into the drum. The binder assists in maintaining the shape and structure of the pellets or balls for packing and shipping. The process may also apply other amendments. For example, in addition to the molasses and tapioca starch, the fertilizer pellets may also have dolomite lime, worm castings, grass seed, or other composts.

Figure 12:
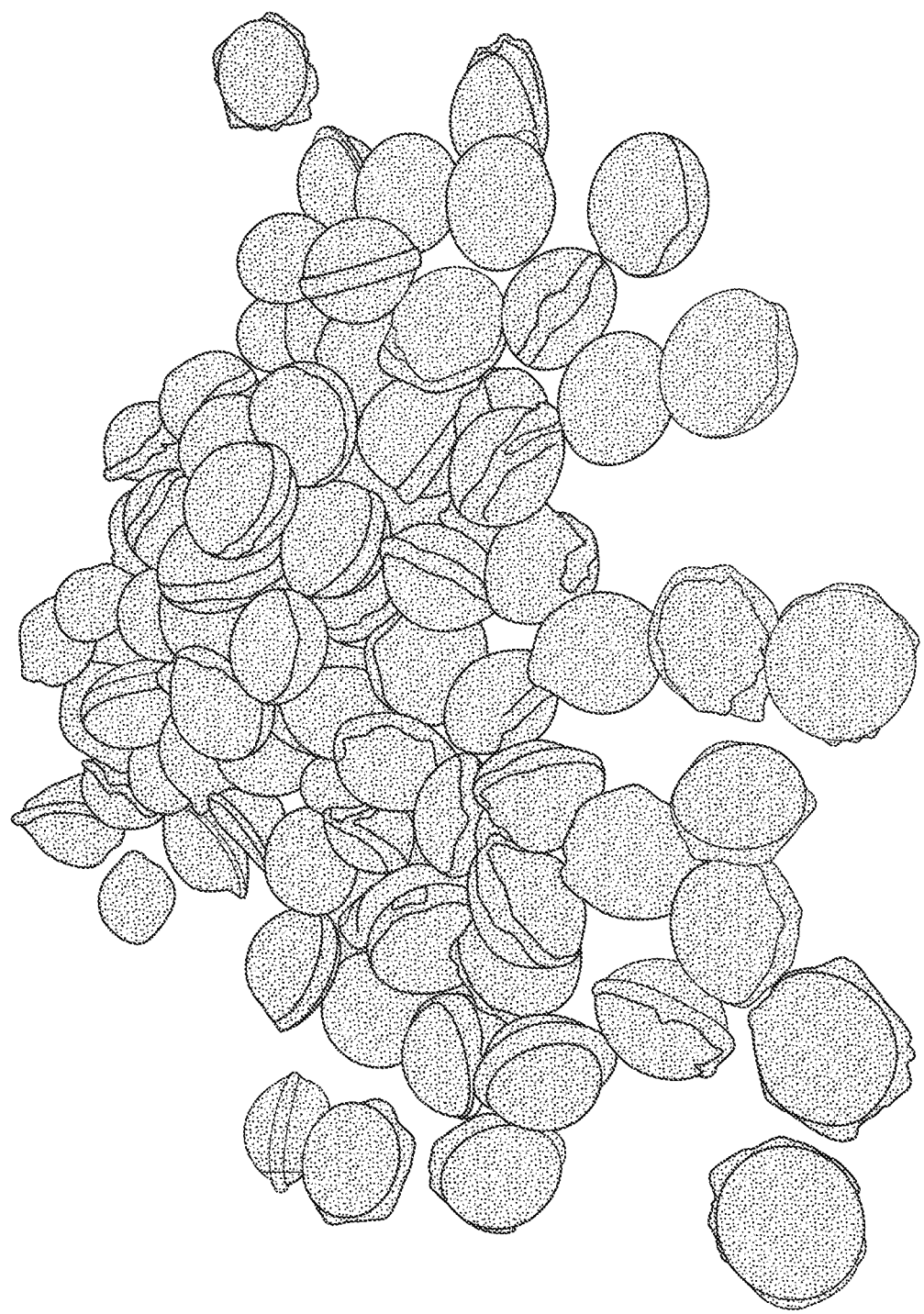
FIG. 12 shows an embodiment of a turf and lawn coir, also usable as cat litter.

FIG. 12 shows examples of round pellets obtained from this process. The results pellets can act as turf and lawn pellets, garden and potting soil, and cat. The only differences that may exist between the two is that the turf and lawn pellets may have different amendment and conditioning added during the various processing steps.

In this manner, one can produce an organic material that is non-hazardous to humans and animals. It has several uses including garden soil, potting soil, greenhouse plant soil, essentially soil for any kind of plants, turf and lawn soil builder, as a soil amendment or conditioner. It can act as a bare root conditioner for trees, or as an erosion control material. Outside of the soil area, it has uses as cat litter, reptile bedding, poultry litter, animal bedding, hazmat cleanup, equestrian arena footing, and K-9 kennel bedding.

It can also include plant seeds such as grass seeds, vegetable seeds, field crops, post-forest fire soil vegetation such as that dropped from aircraft, soil additives and other fertilizer elements, or can be otherwise conditioned for pet litter, animal bedding, or crumb coconut shell infill for synthetic sports fields.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art that are also intended to be encompassed by the accompanying claims.

The invention claimed is:

1. A method of producing coir pellets, comprising
shredding compressed pith to produce loose coconut pith;
conditioning the loose coconut pith and at least one other material to produce conditioned material;
first compressing the conditioned material to produce pellets of a first size at a first compression ratio;
at least a second compressing the pellets of the first size to produce pellets of at least a second size at a second compression ratio, wherein the second size is smaller than the first size, and the second compression ratio is higher than the first compression ratio, wherein at least one of the first compressing or the second compressing comprises compressing at least one of the conditioned material or the pellets of the first size into opposed half cup ball granulators and then pressing the half cup ball granulators together to produce spherical pellets;
using spiked rotary strikers to strike the ball granulators to clear any stuck pellets;
polishing the pellets of at least the second size to produce polished pellets; and
drying the polished pellets to produce the coir pellets.

2. The method as claimed in claim 1, further comprising adding amendments to at least one of the conditioned material, the pellets of the first size, the pellets of the second size, or the polished pellets.

3. The method as claimed in claim 2, wherein the amendments include at least one of hard shell coconut granulars, dolomite lime, worm casings, deodorants, grass seed, molasses, starch, or compost material.

4. The method as claimed in claim 1, further comprising a screening process applied to at least one of the pellets of the first size, the pellets of the second size, the polished pellets, or the coir pellets.

5. The method as claimed in claim 4, wherein the screening process produces waste material and the method further comprises returning the waste material to the first compressing.

6. A method of producing coir pellets, comprising
shredding compressed pith to produce loose coconut pith;
conditioning the loose coconut pith and at least one other material to produce conditioned material;
first compressing the conditioned material to produce pellets of a first size at a first compression ratio;
a second compressing the pellets of the first size to produce pellets of at least a second size at a second compression ratio, wherein the second size is smaller than the first size, and the second compression ratio is higher than the first compression ratio, wherein at least one of the first compressing or the second compressing comprises compressing at least one of the conditioned material or the pellets of the first size into opposed half cup ball granulators and then pressing the half cup ball granulators together to produce spherical pellets;
a third compressing to produce pellets of a third size and having a third compression ratio, wherein the third size is smaller than the second size and the third compression ratio is higher than the second compression ratio, the third compressing comprising using half cup ball granulators having a smaller size than the half cup ball granulators used in the first or second compressing; and using rotary strikers to strike the ball granulators to clear any stuck pellets.

7. The method as claimed in claim 6, further comprising a fourth compressing to produce pellets of a fourth size and having a fourth compression ratio, wherein the fourth size is smaller than the third size and the fourth compression ratio is higher than the third compression ratio, the fourth compressing using half cup ball granulators having a smaller size than the half cup ball granulators used in the third compressing.

8. The method as claimed in claim 6, further comprising polishing the pellets of at least the second size to produce polished pellets.

9. The method as claimed in claim 8, further comprising drying the polished pellets to produce the coir pellets.

10. A method of producing coir pellets, comprising:
shredding compressed pith to produce loose coconut pith;
conditioning the loose coconut pith and at least one other material to produce conditioned material;
first compressing the conditioned material into half cups on a first set of dual apposed cupped ball granulators and then compressing the apposed ball granulators together to produce pellets of a first size at a first compression ratio;
at least a second compressing the pellets of the first size into half cups on a second set of dual apposed cup cylinders to produce pellets of at least a second size at a second compression ratio, wherein the second size is smaller than the first size, and the second compression ratio is higher than the first compression ratio;
using spiked, rotary strikers to strike both of the dual apposed cup cylinders of at least one set of the dual apposed cup cylinders to remove any stuck pellets;
polishing the pellets of at least the second size to produce polished pellets; and
drying the polished pellets to produce the coir pellets.

* * * * *